Feb. 11, 1947.   F. T. NEWELL   2,415,753
ADJUSTABLE PIPE CLAMP
Filed Aug. 24, 1944   2 Sheets-Sheet 1
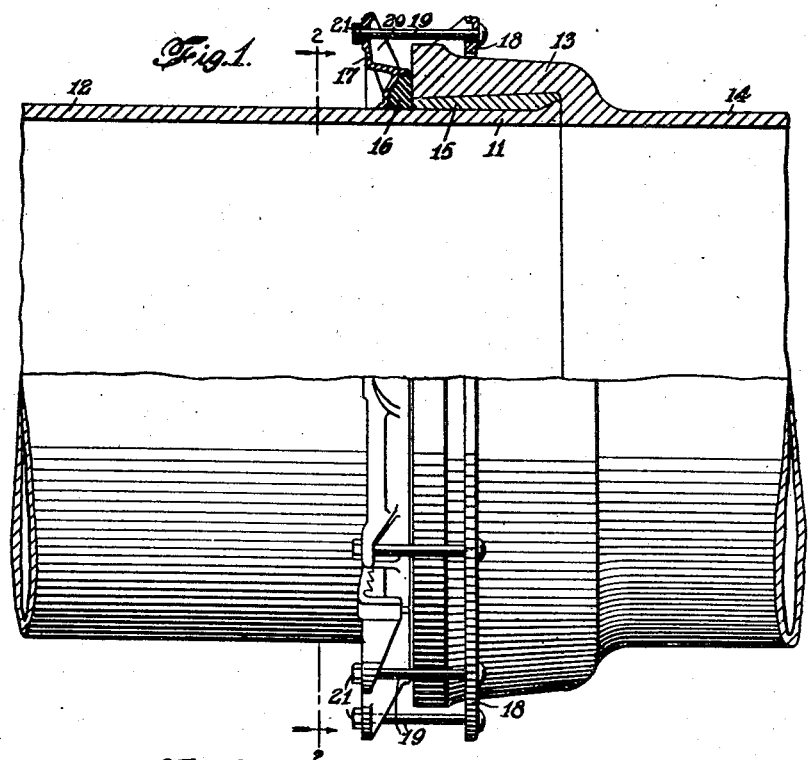
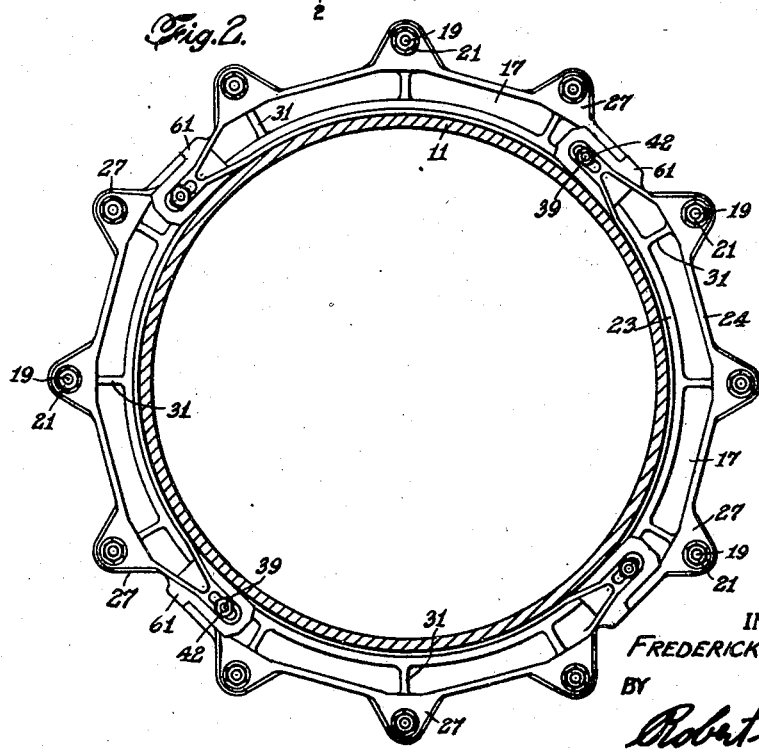
INVENTOR.
FREDERICK T. NEWELL
BY
Robert E. Burns
ATTORNEY.

Feb. 11, 1947. F. T. NEWELL 2,415,753
ADJUSTABLE PIPE CLAMP
Filed Aug. 24, 1944 2 Sheets-Sheet 2
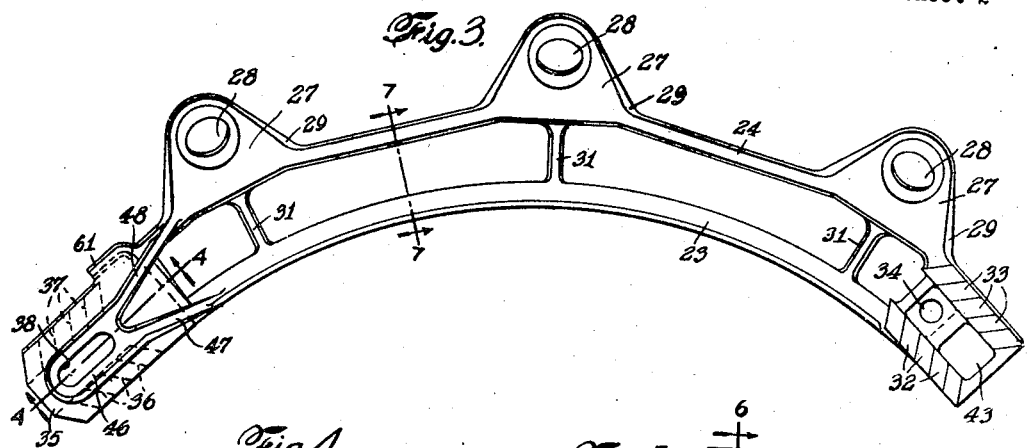
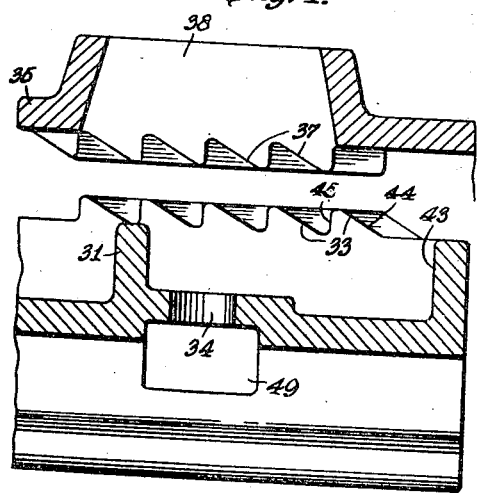
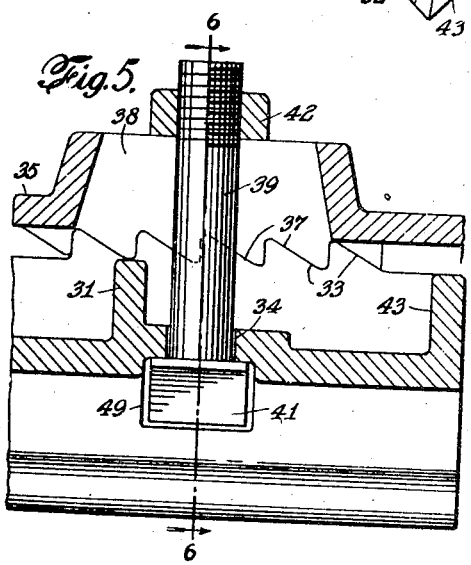
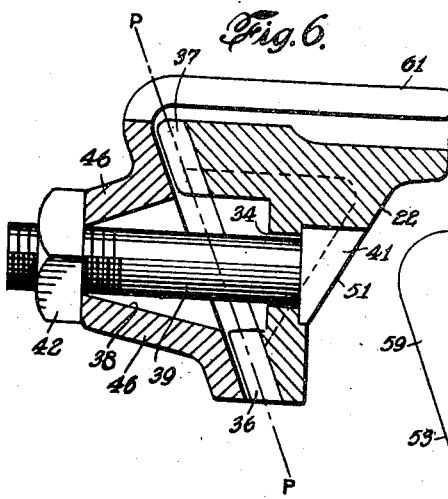
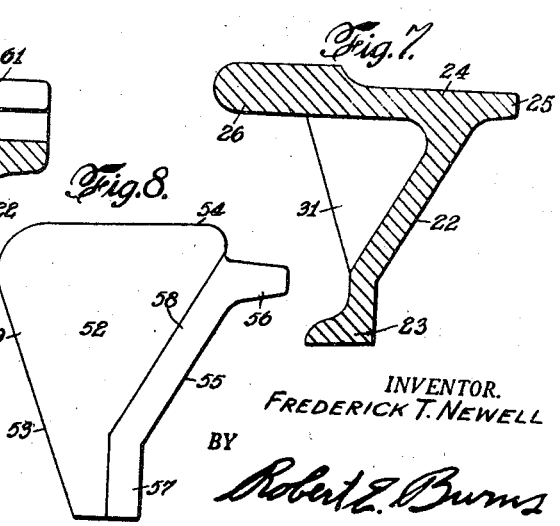
INVENTOR.
FREDERICK T. NEWELL
BY
Robert E. Burns Patented Feb. 11, 1947

2,415,753

UNITED STATES PATENT OFFICE 2,415,753

ADJUSTABLE PIPE CLAMP

Frederick T. Newell, Bradford, Pa., assignor to Dresser Industries, Inc., a corporation of Pennsylvania Application August 24, 1944, Serial No. 551,021

3 Claims. (Cl. 285—119)

My invention consists in the novel features hereinafter described, reference being had to the accompanying drawings which illustrate one embodiment of the same, selected by me for purposes of illustration, and the said invention is fully disclosed in the following description and claims.

The present invention relates to an adjustable pipe clamp for applying sealing pressure to a gasket for a bell and spigot pipe joint.

In laying bell and spigot pipe, lead or other caulking material is commonly packed between the bell and the spigot to make a fluid tight joint. However, in many instances, particularly in high pressure lines, such caulking material does not provide a permanent fluid tight seal and it has been the practice to place a pipe clamp over the joint either when the pipe is installed or when subsequently repairing the pipe line. One kind of pipe clamp used on such joints comprises a split annular gasket encircling the spigot and engaging the end face of the bell, a follower ring for the gasket, an anchor ring engaging the bell, and a plurality of through bolts extending between the two rings and adapted to draw the follower ring towards the anchor ring to press the gasket into sealing contact with the end face of the bell and the adjacent portion of the spigot.

As the external diameter of pipes of the same nominal size varies considerably, it is desirable for the pipe clamp to be adjustable to fit pipe of varying outside diameters. The adjustment of the follower ring is of particular importance so that the follower ring will fit closely around the pipe and avoid excessive space between the ring and the spigot through which gasket material would tend to flow upon application of sealing pressure. However, the adjustment of the follower ring raises difficult problems. When the bolts connecting the follower ring and anchor ring are drawn up they tend to move the follower ring axially of the pipe to apply pressure to the gasket which of course tends to resist such movement. As the bolts are located outside the gasket at a substantially greater distance from the center of the clamp, the pull of the bolts is out of line with the resistance of the gasket, resulting in a couple tending to twist the follower ring. Moreover, the gasket engaging surface of the follower ring is preferably inclined so as to press the ring in against the spigot as well as axially against the face of the bell, and this results in corresponding reaction forces acting radially outwardly on the ring. Still other forces result from the fact that the gasket pressure is distributed throughout the circumferential extent of the ring and should preferably be aproximately uniform while the through bolts connecting the follower ring with the anchor ring are spaced rather widely apart. This results in still further torque and in bending moments acting upon the ring sections. As the present practice calls for high gasket pressures, particularly when used on high pressure pipe lines, these forces tending to burst, bend and twist the follower ring are of a high order. It will thus be seen that the provision of a sectional follower ring comprising sections that are adjustable relative to one another, to vary the diameter of the ring, and capable of satisfactorily withstanding all the stresses to which the ring is subjected in use presents serious difficulties.

The difficulty is further increased by the fact that the follower ring in all of its adjusted sizes must present a smooth and continuous gasket engaging surface without substantial protuberances, gaps or recesses. Moreover, from a commercial point of view it is essential for the pipe clamp to be of such construction that it can be easily and economically manufactured with minimum grinding or machining and without complicated casting or coring that would increase the cost. From the point of view of manufacture and distribution of the clamps, as well as their installation in the field, it is further desirable for the clamps to be of simple construction with a minimum number of loose parts, and yet strong, durable and reliable in service.

It is an object of the present invention to provide, in a pipe clamp for bell and spigot pipe, an improved follower ring which is adjustable to different sizes to fit pipe of different outside diameters and is sufficiently strong and rigid in all of its adjusted sizes to avoid excessive strain or objectionable distortion by the forces to which the ring is subjected in use. Another object of my invention is to provide an improved follower ring of adjustable diameter which provides a continuous gasket engaging surface without objectionable gaps or protuberances, and so constructed as to apply substantial uniform pressure to the gasket throughout its circumferential extent. It is a further object of my invention to provide an adjustable pipe clamp of simple construction that can be economically manufactured and easily and quickly installed. Another feature of the clamp in accordance with my invention is that it is light in weight, thereby conserving material and facilitating handling, shipping and installation, and is yet strong, rugged, durable and dependable.

Further objects and advantages of my invention will be understood from the following description of the pipe clamp shown by way of example in the accompanying drawings, and from the appended claims.

In the drawings,

Fig. 1 is a side elevation of a pipe clamp embodying my invention, showing the clamp applied to a bell and spigot joint, portions of the clamp and the pipe being broken away to show certain parts in section.

Fig. 2 is a sectional view taken on the line 2—2 in Fig. 1, and showing the follower ring of the clamp in end elevation.

Fig. 3 is a corresponding elevation on an enlarged scale of one of the ring sections.

Fig. 4 is a fragmentary sectional view on an enlarged scale, showing the interengaging ends of two sections of the follower ring before they are drawn together, the section being taken on a line corresponding approximately to the line 4—4 in Fig. 3.

Fig. 5 is a fragmentary sectional view similar to Fig. 4, but showing the sections joined together.

Fig. 6 is a cross sectional view taken approximately on the line 6—6 in Fig. 5.

Fig. 7 is a cross section of the follower ring taken on the line 7—7 in Fig. 3.

Fig. 8 is an end elevation of a filler element employed in the clamp.

In Figs. 1 and 2 of the drawings, a pipe clamp embodying my invention is shown installed on a pipe joint comprising a spigot end 11 of one pipe section 12 fitting into a bell portion 13 of another pipe section 14, with caulking material 15, for example lead or cement, packed in between the bell and spigot. The clamp illustrated in these figures comprises an annular gasket 16 formed, for example, of a resilient rubber composition, a follower ring 17 and an anchor ring 18. A plurality of through bolts or clamp bolts 19, provided with nuts 21, extend between the follower ring 17 and the anchor ring 18. The bolts are preferably of the track-head type so that they are held against rotation. It will be seen that by tightening the nuts on the through bolts 19 the follower ring 17 will be drawn towards the anchor ring 18, thereby pressing the gasket 16 against the end face of the bell 13 and the adjacent portion of the spigot 11.

The follower ring 17 is composed of a plurality of arcuate sections united with one another in such manner as to provide a ring of adjustable diameter having the strength, ruggedness and durability of a solid ring. To provide the desired adjustability, the ring is preferably made up of at least three sections, and a still greater number of sections may be used in clamps for pipes of larger diameter. The follower ring illustrated in the drawings is shown with four sections.

The sections of the follower ring are preferably identical with one another so that they can be used interchangeably, thereby reducing the number of parts that need to be kept in stock. One of the follower ring sections is shown in greater detail in Fig. 3, and in cross section in Fig. 7. It will be seen from Fig. 7 that the ring section has an inclined gasket engaging face 22, an integral peripheral flange portion 23, and an integral outer peripheral flange portion 24 having a forwardly extending portion 25 and a reareral flange 24 is shown approximately parallel to the axis of the clamp, i. e., the axis of the pipe, and acts as a bracing flange, giving the ring section strength and rigidity without excessive weight. A plurality of integral lugs or ears 27 extend outwardly from the outer peripheral flange 24, and are provided with holes 28 to receive the above mentioned through bolts 19 (Fig. 1). The bolt lugs 27 have lateral flanges 29 which increase in width as they approach the body portion of the ring section and merge into the outer peripheral flange 24 to provide a strong yet light structure. The rearwardly extending portion 26 of the flange 24 is preferably reinforced adjacent the bolt lugs 27 by radially extending webs 31.

As will be seen from Fig. 1 the through bolts 19 connecting the follower ring 17 with the anchor ring 18 are located a considerably greater distance from the center of the pipe than the gasket engaging surface of the follower ring, so that the pull of the bolts and the resistance of the gasket create a couple tending to twist the follower ring section. Moreover the inclined gasket engaging face 22 (Fig. 7) of the follower ring presses inwardly as well as axially on the gasket, so that the follower ring sections are subjected to bending moments tending to bend the sections between the points of support provided by the through bolts, and are also subjected to forces acting radially outwardly and tending to pull the ring sections apart.

The means provided in accordance with the present invention for adjustably connecting the arcuate sections of the follower ring together is illustrated in Figs. 2 to 6. On the rear face of each ring section adjacent one of its ends there are provided a series of teeth or shoulders 32, 33, extending transversely of the ring section. A bolt hole 34 extends through the ring section adjacent the end at which the shoulders 32, 33 are provided. At the other end of the ring section there is provided an integral extension 35 which is offset rearwardly from and extends circumferentially beyond the gasket engaging surface of the ring section. On the forward face of the extension 35 there is provided a series of spaced transversely extending teeth or shoulders 36, 37 which are complementary to and are adapted to engage and interlock with the shoulders 32, 33 formed on the rear face of the adjacent ring section. An elongated bolt hole 38 provided in the extension 35 is adapted to register with the bolt hole 34 of the adjacent section when the two sections are assembled. A bolt 39 (Figs. 5 and 6) having a head 41 and a nut 42 extend through the aligned bolt holes 34 and 38 and in cooperation with the interengaging shoulders 32, 33 and 36, 37 holds the two ring sections rigidly and securely together. It will be understood that the shoulders 36, 37 provided on the integral extension 35 are adapted interchangeably to engage different ones of the shoulders 32, 33 provided on the rear face of the adjacent ring sections, so that the ring sections can be connected in different relationships, to provide a follower ring of variable diameter.

As will be seen from Fig. 6, the shoulders 32, 33 provided on the rear face of the ring sections shown in the drawings, are disposed in a plane intersecting the axis of the clamp. This plane, which is taken as the median plane or pitch line of the shoulders 32, 33, is represented by the dot and dash line P—P in Fig. 6. The plane P—P is inclined at an angle to the axis of the clamp, the angle of inclination being shown approximately equal but opposite to the angle of inclination of the gasket engaging face 22 of the ring section. The gasket engaging face 22, the rearwardly extending outer peripheral flange 24, and the plane P—P of the shoulders 32, 33, thus form three sides of a triangle. This arrangement provides a strong ring structure that will withstand the severe stresses imposed upon the ring in use without breaking or distortion.

In the embodiment of my invention illustrated in the drawings, the inner peripheral flange 23 and the rearwardly extending portion 26 of the outer peripheral flange 24 are thickened adjacent an end of the ring section, and the teeth or shoulders 32, 33 are formed on the thickened portions of these flanges. Thus, the shoulders 32 extend transversely across the thickened end portion of the inner peripheral flange 23, while the shoulders 33 extend across the thickened end portion of the outer peripheral flange 24. This provides in effect two series of spaced shoulders, one series on either side of the bolt holes 34. A recess 43 (Fig. 3) may if desired be provided between the two series of shoulders. It will be seen that the shoulders 32 are arranged parallel to one another and are inclined at an angle to the circumference of the ring. The shoulders 33 are likewise parallel to one another and are inclined to the circumference of the ring, the angle of inclination being approximately equal but opposite to the inclination of the shoulders 32. The two series of shoulders 32, 33 taken together thus form a herring-bone pattern. It will of course be understood that the shoulder 32, 33, may be curved instead of being rectilinear as shown.

The integral extension 35 at the opposite end of the ring section is likewise provided in the particular embodiment shown in the drawings, with two series of shoulders, 36, 37, one on each side of the elongated bolt hole 38. The shoulders 36 are adapted to engage shoulders 32 provided on the inner peripheral flange of the adjacent ring segment, while shoulders 37 are adapted to engage shoulders 33 provided on the outer peripheral flange of the adjacent section. As will be seen from Fig. 3, the shoulders 36, 37, like the shoulders 32, 33, are inclined to the circumference of the ring, the angle of inclination of the shoulders 36 being approximately equal and opposite to the angle of inclination of the shoulders 37. The arrangement of the shoulders 36, 37 will thus correspond to the arrangement of the shoulders 32, 33, so that the two sets of shoulders provided respectively on the extension 35 and on the rear face of the adjacent ring section interfit with one another when the sections are assembled to hold the sections against twisting relative to one another, and also against separation in a circumferential direction. The inclination of the shoulders in opposite directions on opposite sides of the center line of the sections also holds the sections in proper alignment, preventing relative displacement in a direction radially of the pipes. The inclination of the shoulders also provides a greater length of shoulder engagement and hence greater strength.

Each of the interengaging shoulders 32, 33 and 36, 37 is preferably of triangular cross section, providing one square face and one inclined face. For example, in Fig. 4, the shoulders 33 are provided with inclined faces 44 and a square face 45. The other shoulders are correspondingly formed. The square faces of the shoulders 32, 33, face away from the end of the ring sections, and the square faces of the shoulders 36, 37 face away from the end of the extension 35, so that the interengaging square faces of the shoulders hold the ring sections against separation in a circumferential direction without excessive strain on the connecting bolts 39. The interengaging inclined faces of the shoulders tend to move the corresponding square faces into engagement as the overlapping portions of two adjacent ring sections are drawn together by the bolts 39, and in cooperation with the square faces of the shoulders and with the bolts 39, hold the ring sections against twisting and distortion.

The integral extensions 35 provided at one end of the follower ring sections are preferably reinforced by a flange 46 surrounding the bolt hole 38 and by diverging flanges 47 and 48 which connect with the flange 36 and merge into the inner peripheral flange 23 and outer peripheral flange 24, respectively, of the ring sections. When the forward face of the extension 35 is inclined relative to the axis of the clamp, as shown in Fig. 6, the flange 46 surrounding the bolt hole 38 is preferably made higher on one side of the hole than on the other, so as to provide surfaces approximately perpendicular to the bolt 39 for engagement with the nut 42.

The bolt hole 34 extending through the end portion of the ring section (Figs. 3, 4 and 6) terminates in a recess 49 formed in the forward face of the ring section to receive the head 41 of bolt 39. The recess 49 is non-circular to hold the bolt from turning, being shown of rectangular shape. The head of the bolt substantially fills the recess and the forward or exposed face of the bolt head is inclined, as indicated at 51 so as to be flush with the gasket engaging surface 22 of the follower ring. The recess 49 and the head of the bolt are preferably offset or unsymmetrical, relative to the bolt hole, and the shaft of the bolt, so that the bolt cannot be placed in other than its correct position.

It will be understood that the angular relation of the forward face of the extension 35 provided at one end of each ring section, and the distance the extension is offset rearwardly from the front face of the section are such that when the ring sections are assembled and secured together by the bolts 39 the gasket engaging surfaces of adjacent ring sections are in alignment with one another. When the follower ring is adjusted to its smallest diameter the gasket engaging surface of one section abuts the gasket engaging surface of the adjacent section, providing a continuous surface for applying pressure to the gasket. When the ring is adjusted to larger diameters by bringing the shoulders 36, 37 of the extension 35 into engagement with different shoulders 32, 33 on the rear face of the adjacent ring sections, the end of the gasket engaging surfaces of the two adjacent sections are spaced from one another and one or more filler elements 52 are placed between adjacent sections to provide a continuous gasket engaging surface. One such filler element is shown in end elevation in Fig. 8. It will be seen that the filler element is substantially triangular in shape with an inclined rear edge 53, an outer edge 54 and an inclined gasket engaging face 55. A forwardly projecting portion 56 corresponds to the forwardly projecting portion 25 of the outer peripheral flange 24 (Fig. 7) of the follower ring, while an inner portion 57 corresponds to the inner peripheral flange 23 of the ring. The forward face of the filler element 52 thus correspond in contour with the forward face of the follower ring 17. The forward portion of the filler element is preferably formed as a flange 58, the forward portion being thicker in a direction circumferential of the clamp than the rearward portion 59. When the filler element 52 is in place between two adjacent ring sections the rear edge 53 engages the forward face of the extension 35, and the outer edge 54 engages a peripheral flange portion 61 (Figs. 2, 3 and 6) which extends forwardly from the outer periphery of the extension 35. It will be seen that the flange 61 is approximately parallel to the outer peripheral flange 24 of the ring section, but is preferably a little further out from the center of the clamp so that it will fit over the outer surface of the adjacent ring section without a reduction in the cross section of the latter. The end faces of the filler element 52 engage the end faces of the adjacent ring sections, or of other filler elements when more than one filler is used. The filler element is thus held securely in position and is pressed against the gasket when the follower ring is drawn up by the through bolts 19, so that substantially uniform pressure is applied to the gasket through its circumferential extent. The thickness of the filler element 52 in a circumferential direction is preferably equal to the circumferential spacing of the interengaging shoulders 32, 33, 36, 37, or a multiple thereof, so that the filler element will fit snugly between the end faces of adjacent segments when the ring diameter is enlarged by bringing the shoulders 36, 37 into engagement with different ones of the shoulders 32, 33, provided on the rear face of the ring sections. Hence a substantially continuous gasket engaging surface is provided by the ring regardless of the diameter to which it is adjusted.

It will be understood from the above description that since the extension 35 of each ring section overlaps the contiguous end of the adjacent section, the total length of all the ring sections including the extension 35 is greater than the circumferential extent of the assembled ring. In other words, the arcuate extent of each ring section including the length of the extension 35 is greater than 360° divided by the number of sections. For example, in a ring made up of four sections the arcuate extension is greater than 90°. However, the arcuate extent of the gasket engaging face of each section is equal to or less than 90° (in a four section ring) depending on whether or not filler pieces are used in assembling the ring.

In applying the clamp described above to a bell and spigot pipe joint the end face of the bell and adjacent surface of the spigot are thoroughly cleaned. The anchor ring 18 is then assembled on the bell and the follower ring 17 is assembled on the spigot. In assembling the follower ring the inner diameter of the ring is adjusted to a sliding fit on the spigot by adjusting the amount that the extension 35 of each ring section overlaps the contiguous end of the adjacent ring section. The adjustment should be distributed as equally as possible over all the sections. Where the gasket engaging surfaces of adjacent sections do not abut, one or more filler elements 52 are inserted to provide a continuous surface. The sections of the follower ring are bolted together by the bolts 39 and the nuts 42 are drawn up tight.

After the anchor ring and follower ring have been assembled on the pipe as described, the follower ring having been assembled about eight or ten inches from the face of the bell, the gasket 16 is placed in position around the spigot and against the face of the bell. The follower ring is then pushed into position against the gasket, the through bolts 19 are inserted between the anchor ring and follower ring, and the nuts 21 are drawn up uniformly to cause the follower ring to press the gasket into sealing engagement with the end face of the bell and the adjacent portion of the spigot. It will be seen that the clamp can thus be easily and quickly applied to the pipe, even when working under difficult conditions, as for example, in a small excavation.

While my invention has been described in conjunction with the particular embodiment shown by way of example in the drawings, it will be understood that the invention is not limited to the specific construction shown.

What I claim and desire to secure by Letters Patent is:

1. In a pipe clamp for applying sealing pressure to a gasket for a bell and spigot pipe joint, an anchor ring, a sectional follower ring having a gasket engaging surface on its forward face, a rearwardly projecting bracing flange, and a plurality of outwardly projecting apertured bolt lugs, a plurality of bolts extending through said lugs and connecting the follower ring and anchor ring, and means for adjustably connecting adjacent sections of said follower ring together in a unitary structure capable of transmitting uniform pressure to the gasket and resisting forces tending to expand and to burst said ring, comprising a series of spaced shoulders provided on the rear face of the gasket engaging portion of one of said sections adjacent an end thereof, said shoulders extending transversely of the ring section in a plane intersecting the axis of the clamp, an integral extension provided on the adjacent follower ring section, said extensions being offset rearwardly from and projecting circumferentially beyond the gasket engaging surface of said latter section, and having on its forward side a series of spaced shoulders adapted interchangeably to engage selected ones of the said shoulders provided on the rearward face of the first mentioned section, and a bolt extending through the overlapping portions of said sections and cooperating with said interengaging shoulders to unite said sections rigidly together.

2. In a pipe clamp for applying sealing pressure to a gasket for a bell and spigot type joint, a follower ring of adjustable diameter comprising a plurality of arcuate sections, and having on its forward face a gasket engaging surface, and means for adjustably connecting adjacent sections into a strong unitary structure, comprising a series of spaced rearwardly projecting shoulders provided on the rear face of the gasket engaging portion of each of said sections adjacent an end thereof, said shoulders extending transversely of the ring and having portions disposed at different angles to the periphery of the ring, an integral extension provided on the contiguous end of the adjacent ring section, said extension being offset rearwardly from and projecting circumferentially beyond the gasket engaging surface of said latter section and having on its forward face a series of spaced shoulders adapted interchangeably to engage selected ones of the said shoulders provided on the rearward face of the first mentioned section, and a bolt extending through the overlapping portions of said sections and cooperating with said interengaging sections in predetermined adjusted relationship.

3. In a pipe clamp for applying sealing pressure to a gasket for a bell and spigot pipe joint, a follower ring comprising a plurality of arcuate sections and having on its forward face a gasket engaging surface, and means for adjustably connecting adjacent sections of the ring into a strong unitary structure, comprising a series of spaced, rearwardly projecting shoulders on the rear face of each of said sections adjacent an end thereof, said shoulders extending transversely of the ring section in a plane intersecting the axis of the clamp, an integral extension provided on the contiguous end of the adjacent ring section, said extension being offset rearwardly from and extending circumferentially beyond the gasket engaging surface of said latter section and having on its forward face a series of spaced shoulders adapted interchangeably to engage selected ones of the said shoulders provided on the rearward face of the first mentioned ring section, a flange portion extending forwardly from the outer periphery of said extension, a bolt extending through the overlapping portions of said sections and cooperating with said interengaging shoulders to unite the ring sections with the gasket engaging surface of one section spaced from the gasket engaging surface of the adjacent section, and a filler element retained in place between the ends of said sections by said extension and said flange and having a gasket engaging face adapted to fill the space between the gasket engaging surfaces of said adjacent sections.

FREDERICK T. NEWELL.

REFERENCES CITED

The following references are of record in the file of this patent:

UNITED STATES PATENTS

| Number | Name | Date |
| --- | --- | --- |
| 1,951,034 | Norton | Mar. 13, 1934 |
| 1,916,968 | Davis | July 4, 1933 |
| 2,059,573 | Gavin | Nov. 3, 1936 |